G. L. SMITH.
FRICTION BRAKE.
APPLICATION FILED APR. 3, 1920.
1,422,006.
Patented July 4, 1922.
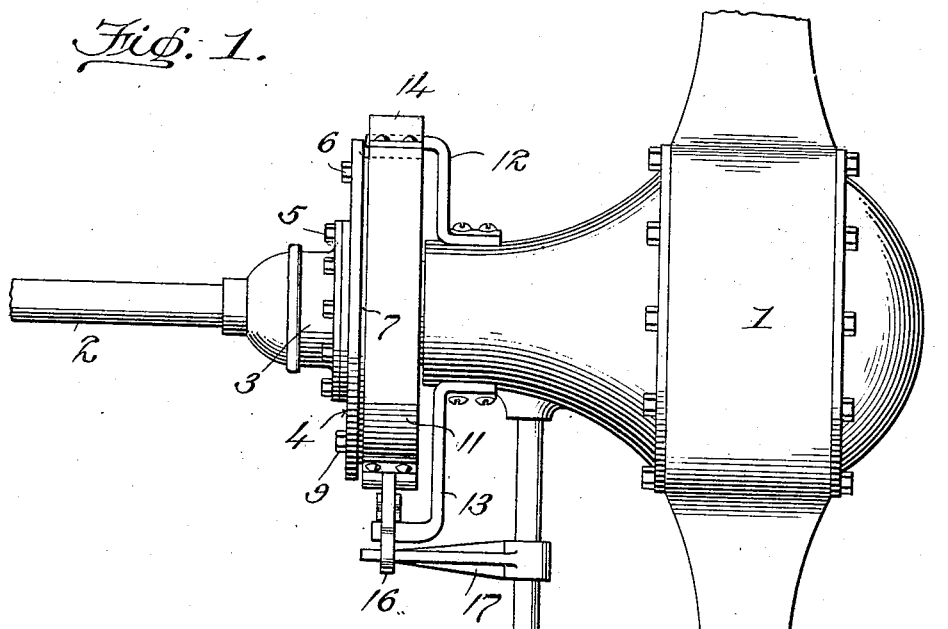
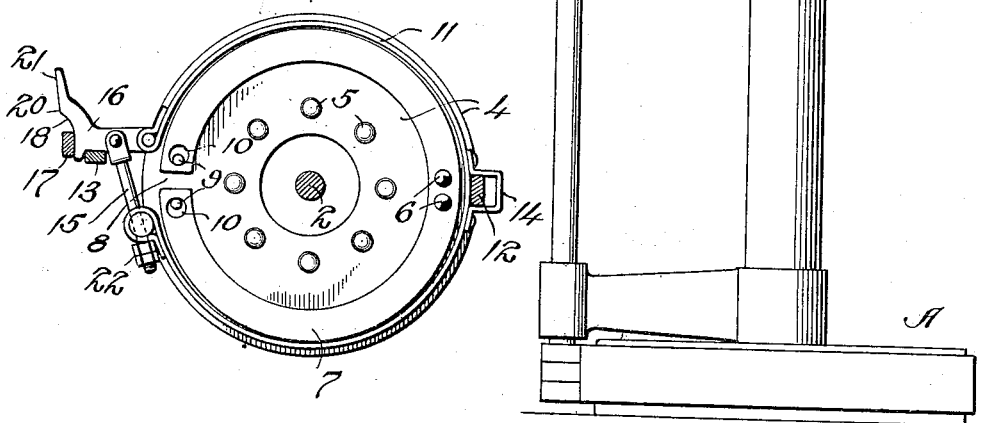
Inventor
George L. Smith,
By Henry P. Bright
Attorney

UNITED STATES PATENT OFFICE.

GEORGE L. SMITH, OF WASHINGTON, DISTRICT OF COLUMBIA.

FRICTION BRAKE.

1,422,006.  Specification of Letters Patent.  Patented July 4, 1922.

Application filed April 3, 1920. Serial No. 371,017.

*To all whom it may concern:*

Be it known that I, GEORGE L. SMITH, a citizen of the United States, residing at Washington, in the District of Columbia, have invented certain new and useful Improvements in Friction Brakes, of which the following is a specification.

My invention relates to friction brakes of the contracting band type in which the band pressure is obtained by the combination of forces due to the elasticity of the metal in the brake shoe and to the centrifugal force developed by the weight of metal in the shoe.

It is my purpose to provide a brake which will produce a retarding action varying in a certain ratio to the speed of the moving part to be retarded and which will be especially adaptable to use on automotive land vehicles so that; first, the speed of such vehicles due to gravity down a grade can be more effectually controlled and, second, the maximum retarding force can be mechanically limited to an amount which the machinery of the vehicle can stand with safety. In the case of such vehicles I attach the parts to that drive member having the greatest speed of rotation commonly known as the propeller shaft in order that a maximum of centrifugal force may be employed and at the same time ensuring an equal application of the retarding force to each driving wheel through the medium of the differential gearing commonly used.

I will describe my invention in the best form known to me at present and as applied to the propeller shaft of a motor vehicle, but it will be understood that the invention is in no way limited to such use and that it is applicable in any instance where it is desired to retard a rotating member.

Furthermore, it will be apparent that my invention is susceptible to changes in forms and proportions and to desirable additions with the exercise of only ordinary mechanical skill and without departing from the scope of the invention as set forth in the appended claims.

In the drawings chosen to illustrate my invention—

Fig. 1 is a plan view of my brake structure applied to the usual type of rear axle of a motor vehicle; and Fig. 2, a rear view of the brake structure.

In the drawings 1 indicates the differential housing, 2 the propeller shaft, 3 the rear universal joint, and A one of the wheel brakes shown typically.

A circular plate 4 of sheet steel is bolted to the flange of the universal joint 3 using the flange bolts 5 as provided in usual designs. This plate 4 is thus seen to rotate with the propeller shaft. The brake shoe 7, which is a circular ring of metal split at 8 is secured to the plate 4 by means of the bolts 6. Two pins 9 are secured to the plate 4 and project through holes 10 in the brake shoe 7, these holes being of larger diameter than the pins 9. These pins 9 are so spaced that it is necessary to spring the free ends of the brake shoe 7 together a small amount in order to mount the shoe on the disk 4 in proper operating position and the shoe itself is mounted so that its circumference will be concentric with the axis of rotation when the shoe 7 is contracted sufficiently to bring the pins 9 central with the holes 10. These pins are thus seen to prevent expansion of the brake shoe under the influence of centrifugal force while the brake is in inoperative position and to permit contraction under pressure of the brake band to its operative size which brings it concentric with the axis of rotation.

A brake band 11 surrounds the shoe 7 and is supported from the rear axle by the brackets 12 and 13. The anchor clip 14 riveted to the brake band 11 fits over the end of the bracket 12 and prevents rotation of the brake band. The usual toggle lever 16 with its adjustable connecting bolt 15 are provided to effect contraction of the brake band. When the brake is released the lever 16 rests on the arm of the bracket 13 and thus holds the brake band clear of the brake shoe. A lever 17 is mounted on the brake rod 19 usually fitted to rear axles for operation of the wheel brakes and the end of this lever 17 operates on a cam surface 18 of the lever 16. By this means the brake can be operated by the same foot lever that operates the wheel brakes as follows. Pressing down on the foot brake lever to operate the wheel brakes rotates the shaft 19 in the direction represented by the arrow, thus raising the end of the lever 17 and causing it to operate the lever 16 through its action on the cam surface 18. After passing the corner 20 at the end of the cam surface no further rotation of the lever is produced as the face 21 then becomes parallel to the direction of movement of the lever 17.

It can best be seen how the brake operates by outlining the proper adjustment of the same. To effect this adjustment press down on the service foot brake lever all the way and then let it come back about one-third of its total throw. Then position lever 17 so that it will be just off the cam surface 18 and just on the straight surface 21. When so positioned then adjust brake band by the tightening nut 22 until the pins 9 are central with the holes 10.

With the parts in the above position it will be apparent that when at rest the pressure of the band upon the shoe is the result of a compression of the shoe to a smaller diameter which decreases the width of the gap 8 and that when in motion the above pressure is increased by an amount which depends upon the weight of the shoe 7 and the velocity of rotation of this shoe.

It will also be seen that the maximum total value of the two forces; that due to the elasticity of the brake shoe and that due to centrifugal force; can be controlled by limiting the weight and stiffness of the brake shoe together with the cam and straight surfaces 18 and 21 limiting the movement of the lever 16 so that the operator of the vehicle can never overstrain the rear axle drive system by his own effort.

Furthermore it will be noted that I provide successive operation of the centrifugal and then the wheel brakes since the retarding action due to centrifugal force diminishes with the speed of the vehicle and when such force becomes insufficient to stop the vehicle as quickly as desired the wheel brakes can be applied to make up this loss.

From the above it will be noted that I can so arrange the combination of centrifugal and wheel brakes to cause them to act successively or simultaneously and that I can dispense with the use of a so called emergency brake operated by a hand lever without losing any efficiency of control of the car; that by utilizing the rear axles within their safe limits of strength to carry the centrifugal brake action to the drive wheels of the vehicle I reduce the number of parts required and simplify construction and at the same time obtain the added advantage of a uniform distribution of braking force to each drive wheel through the medium of the differential; that I prevent the vehicle from excessive speed on down grades as I employ a force which increases with the square of the speed up to the limit of safety of the drive axles, and that overheating due to long application of the brake can do no damage other than to burn out the brake lining, since it is not secured to inflammable material as is the case with brakes on wood wheels.

It will also be seen that my design of brake reduces the tendency of the rear wheels to lock and injure the tires, since, in case they should lock, centrifugal force would be reduced to zero and thus permit the wheels to start rotating again.

I claim:—

1. In a brake structure, the combination of a rotatable member, a compressible resilient and initially compressed brake element fixed to said member and tending to overcome compression thereof by the action of centrifugal force thereon due to rotation of the member, and a second brake element engageable with the first element to further compress the latter.

2. In a brake structure, the combination of a rotatable member, a compressible resilient brake element fixed to and held initially compressed by said member and tending during rotation of the member to overcome compression thereof by both its resiliency and the action of centrifugal force thereon, and a second brake element engageable with the first element to further compress the latter.

3. In a brake structure, the combination of a rotatable member, a compressible resilient and initially compressed brake shoe having the form of a split ring and fixed to said member, said brake shoe tending during rotation of the member to overcome compression thereof by both its resiliency and the action of centrifugal force thereon, and a brake band surrounding the shoe and operable to further compress the latter.

4. In a brake structure the combination with a rotatable member and a fixed contracting brake band, of an initially compressed resilient brake shoe fixed to said member and surrounded by said band, and means engaging said shoe to effect the initial compression thereof, said means permitting further compression thereof by the contraction of said brake band.

5. In a brake structure the combination of a rotatable member, an initially compressed resilient brake shoe having the form of a split ring and fixed to said member, means fixed to said member and engaging said shoe to effect the initial compression thereof, and a contracting brake band engageable with said shoe and operable to further compress it.

6. In a brake structure the combination with a rotatable member and a fixed contractible and adjustable brake band, of means fixed to said member visually indicating the accuracy of adjustment of said band when in contracted engagement with said means.

7. In a brake structure the combination with a rotatable member and a fixed contractible and adjustable brake band of an initially compressed resilient brake shoe fixed to said member, and means engaging said shoe to effect the initial compression thereof, said means visually indicating the accuracy of adjustment of said brake band when in contracted position.

8. In a brake structure the combination with a rotatable member and a fixed contractible and adjustable brake band, of an initially compressed resilient brake element having the form of a split ring and fixed to said member at a point opposite the free ends of said element, and means fixed to said member and engaging the free ends of said element to effect the initial compression thereof, said means permitting further compression thereof by contraction of the brake band and visually indicating the accuracy of adjustment of said band when in its contracted position.

9. In a brake structure the combination of a rotatable member, a fixed contractible brake band and an initially compressed resilient brake element fixed to said member and engageable with said band when in its contracted position, said element exerting during such engagement a braking pressure on said band controlled simultaneously by the initial compression, the resiliency and the speed of rotation of said element.

In testimony whereof I have hereunto affixed my signature in the presence of two witnesses.

GEORGE L. SMITH.

Witnesse:
HENRY T. BRIGHT,
CARROLL BAILEY.